Oct. 1, 1968 P. MARTINELLI 3,404,275
METHOD OF ASSAYING AND DEVICES FOR THE APPLICATION OF SAID METHOD
Filed March 30, 1964 3 Sheets-Sheet 3
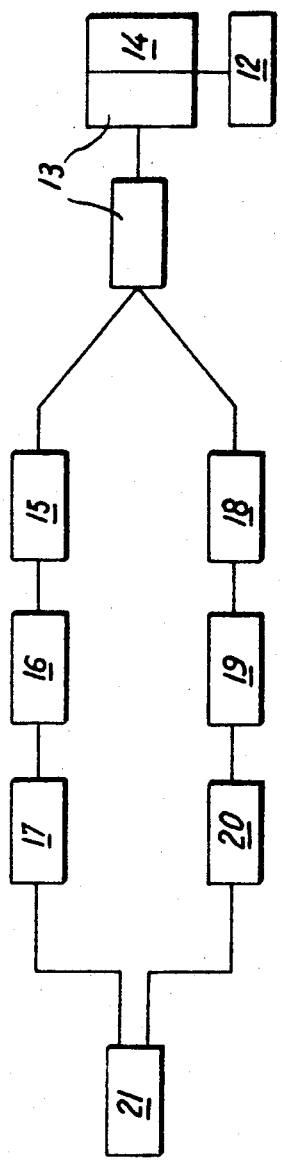
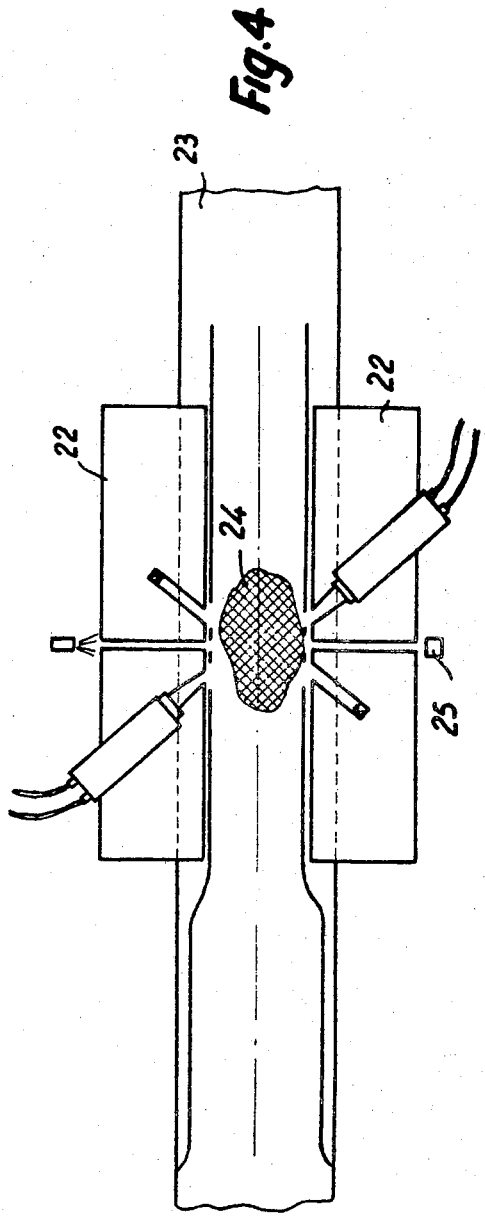

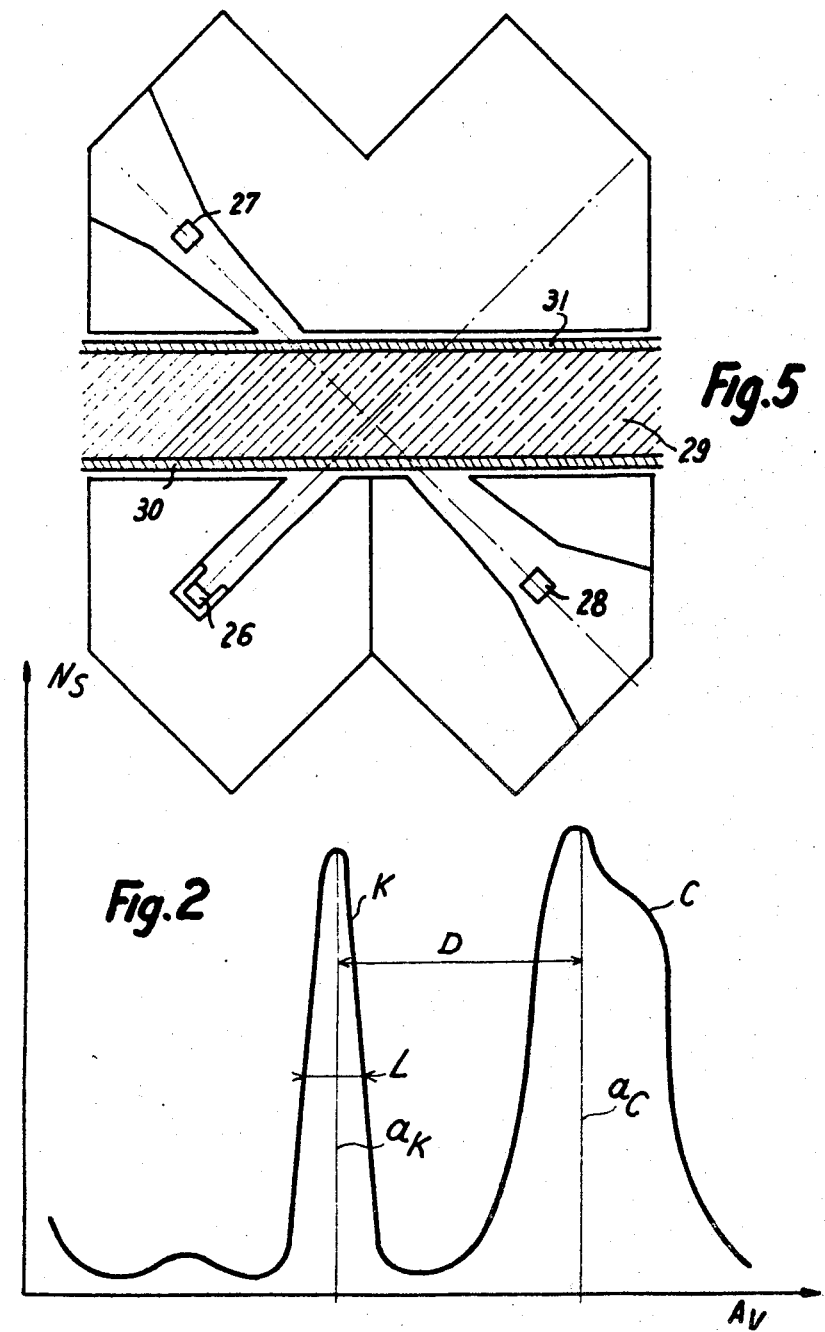

3,404,275
METHOD OF ASSAYING AND DEVICES FOR THE APPLICATION OF SAID METHOD
Pierre Martinelli, Chatillon-sous-Bagneux, France, assignor to Commissariat à l'Energie Atomique, Paris, France
Filed Mar. 30, 1964, Ser. No. 355,760
Claims priority, application France, Apr. 1, 1963, 930,019
2 Claims. (Cl. 250—83.3

The quantitative and qualitative determination of heavy metals such as tantalum, tungsten, gold, mercury, lead, bismuth, uranium, sets problems of a frequently difficult nature as soon as it proves necessary to carry out this determination in a nondestructive manner while satisfying essential requirements of rapidity of measurement and precision. These assaying operations must sometimes be carried out with materials having a number of different geometrical shapes and structures such as fragments of ore, in the presence of very substantial variations in the proportions of the other constituents of these materials; it does also happen that these assaying operations cannot be performed in an effective manner by means of sampling, either on account of the fact that the entire quantity of material has to be tested or on account of the fact that difficulties arise in the preparation of a representative sample or finally by reason of the fact that such sampling is impossible. Finally, the measurement sometimes has to be performed through walls which have a sufficient mechanical strength and therefore a thickness which is often greater than one millimeter.

Among the non-destructive techniques which have been employed up to the present time, analysis by X-ray fluorescence and analysis by X-ray or gamma-ray absorptiometry have frequently been utilized.

The above-noted methods are attended by a number of disadvantages. In the first place, analysis by X-ray fluorescence is commonly carried out by exciting the L lines of the heavy elements to be detected. These lines which correspond to an energy which is still fairly low, namely 1 kv. approximately in the case of the $L\alpha$ lines of lead, are subjected within the sample under analysis to an absorption which varies with the composition of the matrix, that is to say with the percentages of the other elements contained in the sample. This absorption can be very variable and completely vitiate the measurement of the heavy element if the composition of the matrix is not known with accuracy. The intensities of the excited L lines are also influenced by the granular structure, density, chemical structure and homogeneity of the sample. In addition, the measurement of these intensities only applies to a small volume of the sample and it is very often impossible to perform the test behind walls which are made necessary by reason of the nature of the process to be controlled. For all of the foregoing reasons, it is frequently necessary to "prepare" the sample. And the applications of the determination of heavy elements according to the intensity of their L fluorescence lines are thus considerably reduced.

The excitation of the K lines of the heavy elements offers the advantage of permitting the possibility of effecting the determination of said elements through walls of relatively substantial thickness and of minimizing the influence of the matrix on the absorption of the excited K lines. This technique has been applied by employing X-ray tubes at a high voltage of at least 100 kilovolts. Aside from the fact that the development of these high voltages greatly complicates the equipment which is thus made more costly and heavier than equipment of conventional design, the Compton scattering effect in the sample and its support of the continuous spectrum of the exciting radiation superimposes a substantial background upon the fluorescence K line which is analyzed. The said background limits the sensitivity and accuracy of the measurement. Finally, the effect produced by the instability of the X-ray tube on the intensity of the K lines which are measured is all the more marked when the threshold of excitation of the heavy elements is located at energies in respect of which the number of photons capable of exciting said elements varies very rapidly as a function of the voltage of the X-ray tube.

The analysis of heavy elements by absorptiometry of X-rays or gamma rays offers a known advantage in that it can be effected through walls of substantial thickness and that profitable use can be made of the particularly high absorption coefficients of these heavy elements in respect of sufficiently high-energy photons. The considerable variations in percentages of other elements contained in the sample limit the accuracy of the measurements and the indication is usually a function of the thickness of the sample. This applies in the case of sorting of the ores of heavy metals, for example. It is difficult to secure freedom from both of these influences at the same time.

The method in accordance with the invention has for its object to circumvent the main disadvantages referred-to above and to simplify the utilization equipment with respect to conventional fluorescence X-ray techniques. The method is particularly well suited to the determination of heavy elements in matrices which have a low atomic number.

This method is characterized in that the excitation radiation which is emitted by the radioactive isotope utilized has an energy which is several times higher than the energy of the K fluorescence line of the element to be determined, with the result that said line is distinctly different from the line produced by the Compton radiation which is scattered from the sample to be studied.

The method according to the invention is further characterized in that separate counting operations are performed with a view to determining the intensity of the excited K line of the element to be detected and the intensity of the back-scattered Compton radiation. A method which is frequently put into practice consists in establishing the ratio of the intensity of the excited K line (quantity of the element to be detected) to the intensity of the back-scattered Compton radiation (quantity of samples tested), said ratio being directly dependent on the content of heavy elements, taking into account the geometry of the source-detector assembly.

The invention also has for its object an analyzing device for the practical application of the method as defined heretofore for the determination of the heavy element content of a sample. The said device comprises a source consisting of iridium 192, a source-holder unit or collimator which serves to direct the gamma radiations onto the sample, a detector which is placed in a second collimator as well as screens and liners which are fitted on the collimators between these components and the sample, the thickness of the detector being so calculated that this latter is more sensitive to fluorescent radiation than to Compton radiation.

The screens and liners are often formed of cadmium.

A clearer understanding of the technical characteristics of the invention will be gained from the following description of one example of embodiment, it being understood that said example is not given in any limiting sense insofar as concerns either the modes of execution of the invention or the uses to which the invention may be applied, reference being made in this description to the accompanying drawings, in which:

FIG. 2 is a graph showing the radiation spectrum which is impressed on the detectors in the method according to the invention;

FIG. 3 is a block diagram of the electronic device for processing the data collected;

FIG. 4 illustrates an ore-sorting device which utilizes the device in accordance with the invention;

FIG. 5 represents a device which utilizes the method in accordance with the invention for the purpose of measuring the thickness of cladding of a nuclear reactor fuel element.

Figure 1:
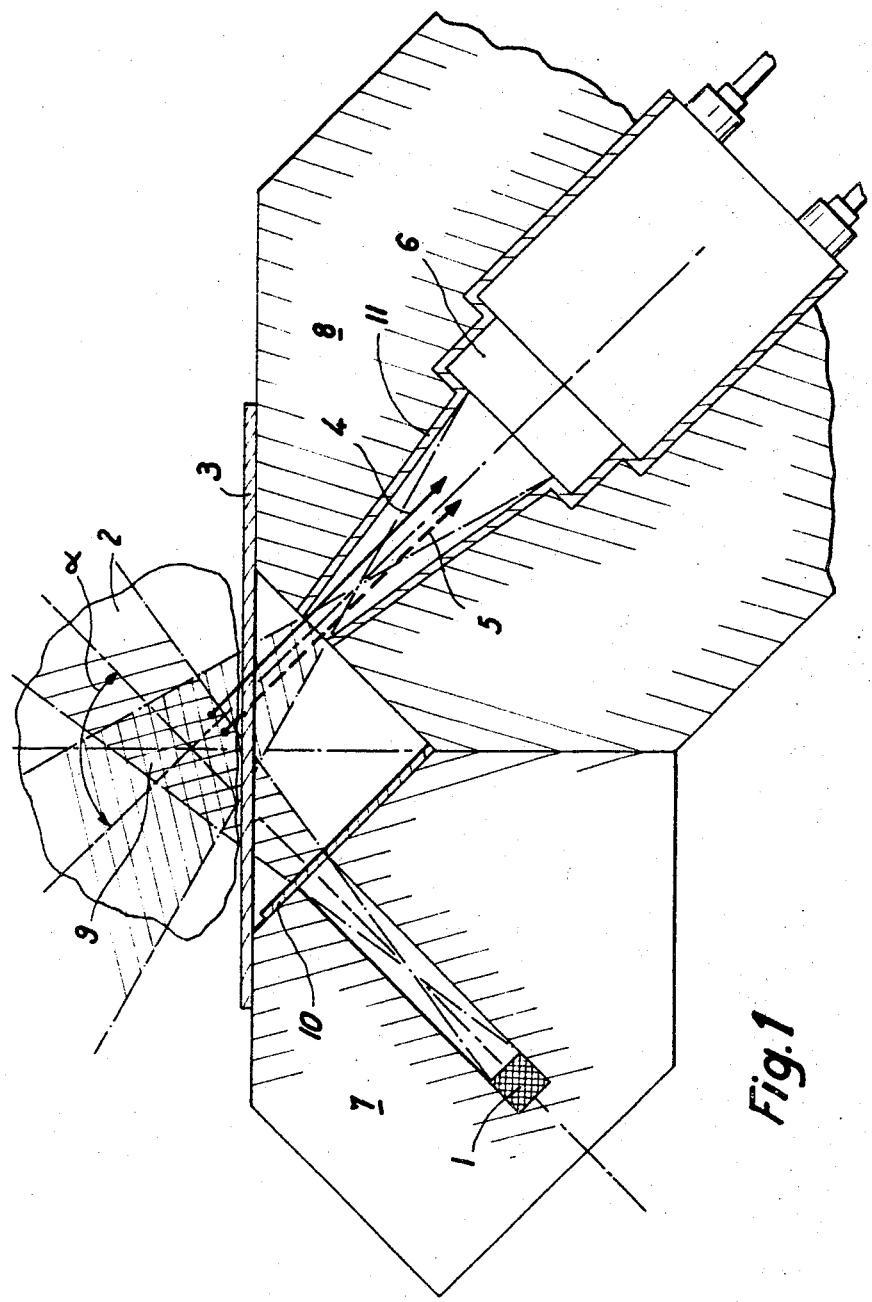
FIG. 1 represents an analyzing device in accordance with the invention.

For the practical operation of the method according to the invention, use is made of a device as represented in FIG. 1 which has a back-scattering geometry. A source 1 of gamma rays irradiates the sample 2, if necessary through the support 3 which can have a relatively high absorption capacity. The excited K radiation 4 and the back-scattered gamma radiation 5 are received by the proportional detector 6 which can be a scintillation counter. A lead shield 7 of appropriate dimensions protects the detector 6 from the direct radiation emitted by the source and limits the dimensions of the exciting radiation beam. A collimator 8 which is placed on the detector 6 completes the dimensional limitation of the zone 9 under analysis and the protection of the detector 6 from the gamma rays which are scattered by the equipment.

The gamma-emitting isotope employed which is contained in the source is chosen in such manner as to ensure that the main energy of the photons scattered by Compton effect towards the detector and which is a characteristic of the angle $\alpha$ (FIG. 1) made between the direction of the gamma rays and the direction of the axis of the detector 6 is distinctly greater than the energy of the K lines of the heavy element which it is desired to determine. Accordingly, the peak or peaks which, in the spectrum of pulses supplied by the detector, correspond to the scattered gamma rays, is distinctly different from the peak which results from the K lines of the element analyzed. These peaks can be observed if the curve of distribution of the number of pulses per second $N/s$ which are comprised within a given amplitude range is plotted as a function of their amplitude A as expressed in volts, for example. FIG. 2 shows a detected radiation spectrum of this type. The two peaks are considered as different when the difference in amplitude (corresponding to the distance D between their respective axes of symmetry $A_k$ and $A_c$, for example, or between the axis of symmetry of the peak which is due to the K lines and the ordinate of maximum intensity of the nearest peak which is due to the scattered radiation) is equal to at least twice the width L at one-half the height of that peak which results from the K lines of the element determined. In the present invention, it is considered that the fact of utilizing a gamma radiation consisting of monoenergetic lines constitutes an appreciable advantage over those processes which have recourse to excitation by means of a continuous spectrum of photons as produced, for example, by an X-ray tube. This feature makes it possible in particular to have a very low background beneath the line which is measured and consequently a higher degree of accuracy.

The energy of the exciting gamma radiation must not, however, be too high by reason of the fact that, on the one hand, the coefficient of photoelectric absorption of the heavy element decreases very rapidly when the energy of the exciting gamma-radiation increases and by reason of the fact that, on the other hand, the direct background radiation which is received by the detector is correspondingly higher as the energy of the gamma rays emitted by the source is higher; and finally, the dimensions of the zone which is under examination would be less clearly defined.

For all of the foregoing reasons, it is an advantage to employ iridium 192 which essentially emits two groups of gamma rays, namely one group whose energy is centered around 308 kev. and another group whose energy is at the level of 470 kev. In addition, iridium 192 can be easily supplied and can also be transported at low cost. Caesium 137 can also be employed. It has the advantage of having a very long half-life but calls for the use of heavier equipment and permits of less sensitive measurements.

The K lines of lead or of any other material which constitutes the shielding (or collimator) of the source-holder unit are eliminated together with the major part of the gamma radiation which is scattered in said shielding by means of a screen 10 of suitable nature and thickness which is placed over the orifice of the source-holding collimator in such manner as to filter the radiation emitted by this latter. The result thereby achieved is to eliminate those photons whose energy is either slightly lower than, equal to or slightly higher than the energy of the K line of the element which it is desired to determine, and which would be partly scattered by Compton effect towards the detector from the sample and its support; this scattering in this energy region is effected without any great change of energy and contributes to the background beneath the peaks which are due to the K lines of the element analyzed and consequently reduces the accuracy of the measurement. Moreover, the K lines which are characteristic of the elements constituting said screen must have an energy which is distinctly lower than that of the K lines of the element to be determined in such manner as to ensure that the detector is capable of separating the two. The material which is employed for the purpose of forming said screen is, for example, cadmium. The use of this shielding material is particularly suitable for the purpose of eliminating the background radiation which appears in the determination of very heavy elements.

The detector element is chosen in such a manner as to give preference to the detection of the K lines to be determined and in such manner as to detect only a reasonable portion of the gamma radiation which is scattered by Compton from the sample and its support. In the case in which said detector is a scintillator, a crystal will be adopted whose thickness as measured along the axis of detection is sufficient for the purpose of ensuring that the K line to be measured is detected with a good efficiency, say, of 80%, whereas the scattered radiation is detected with lower efficiency. However, it is important to ensure that the thickness of said scintillator is not too small in order that the detection of the scattered gamma rays does not give rise to an enrichment of the low-energy pulse spectrum which could be due to an incomplete absorption of the corresponding photoelectrons in the scintillator.

The internal surface of the collimator which covers the detector and of the shielding which surrounds said detector is covered with a plating or lining 11 which is intended to reabsorb and consequently prevent the detection of the K lines of the heavy elements constituting said shielding materials which are excited by the gamma radiation scattered towards the detector. A further object of this precaution is to improve the signal to background ratio.

The measurement of the percentage content of the element is obtained solely from the intensity of the corresponding K line or preferably from the ratio of its intensity to the total intensity of the radiation which is scattered by Compton effect and which is detected. It is also possible to establish the ratio of the intensity of the K line of the element determined to the total number of pulses delivered by the detector or alternatively to the maximum intensity of the highest-intensity peak which is due to the Compton scattering effect. The intensity of the K line will be deduced from the rate of detection of the pulses which are comprised within an amplitude range having a width which is suitably chosen and which corresponds to the maximum intensity of the K line of the element to be determined.

The walls of the containers or of the sample support will preferably be of lightweight materials such as aluminum or plastic materials a few millimeters in thickness but can be fabricated of usual metals on conditions that the thickness thereof does not exceed a certain limit.

The method of measurement in accordance with the invention as employed in a device of the type which is shown schematically in FIG. 1 offers a number of advantages. The ratio of the intensity of K fluorescent radiation of the element to be determined which is detected to the intensity of the radiation which is scattered then detected scarcely depends at all or at least very little on the density of the sample. This ratio is equal to $$k\frac{\tau\omega}{\mu_c}$$

$k$ being a constant of the apparatus and depending among other factors on the geometry of this latter;
$\tau$ being the coefficient of photoelectric absorption of the element to be determined in respect of the gamma radiation which is emitted by the source;
$\mu_c$ being the coefficient of Compton effect absorption of the sample in respect of this same radiation;
$\omega$ being the content of heavy element.

However, the density plays a small part on account of the difference between the absorptions of the excited K radiation and of the scattered radiation before these radiations pass out of the sample. Those skilled in the art will judge the most suitable depth at which the measurement is to be taken.

The same ratio only depends to a very small extent on the composition of the matrix inasmuch as the coefficient $\mu_c$ essentially depends on the energy of the photons and to a very small extent on the atomic number of the elements which constitute the absorber. In the case of water or of hydrogenated products, this factor $\mu_c$ as expressed in cm.$^2$ per gram is slightly higher. However, this ratio is liable to be slightly modified by the presence within the sample of elements having a high coefficient of photoelectric absorption in respect of the K lines of the element determined.

In the case of the determination of heavy metals contained in matrices having a low atomic number, the variations in chemical composition of said matrix and, similarly, the variations in the density thereof, will hardly modify to any appreciable extent the initial ratio of the K lines to the scattered radiation which is due to the Compton effect.

The measurement of one ratio makes it possible for the determination of the element to be analyzed to be made independent of the radioactive decay of the source. The intensity of the K line as well as the intensity of the scattered radiation decrease with the life-time or half-life of the source which is employed. When a source is replaced, for example, the calibration of the apparatus remains effective if the replacement is made with a source of the same type as the one previously employed. A radioactive isotope having a relatively short half-life can be employed on condition that said isotope is replaced as soon as the statistical fluctuations in the number of photons detected become troublesome and accordingly limit the accuracy of the measurement.

The measurement of the ratio considered makes it possible to take into account the fact that the contribution to the background radiation which is observed beneath the peak, such contribution being due to the detection by Compton effect of the scattered radiation, is approximately proportional to the total intensity of the scattered radiation spectrum.

Finally, the aforesaid ratio hardly depends at all on the dimensions and shape of the sample undergoing examination; this ratio remains at the outset equal to $$k\frac{\tau\omega}{\mu_c}$$

even if the sample is smaller than the volume of measurement which is examined by the apparatus.

Advantages of the method have been described in the foregoing. The accuracy of the measurements performed can be further improved by taking the following additional precautions:

Whenever possible, and provided that the content of heavy element is not too high, steps are taken to ensure that no part of the support is in direct line of access both to the source and to the detector. The sample support is thus prevented from modifying the ratio of the intensity of the K line to the intensity of the scattered radiation;

samples having constant dimensions are taken whenever possible and examined under the same geometrical conditions. This precaution permits the possibility of improving the sensitivity of detection;

the transverse dimensions of the exciting gamma-radiation beam which are defined by the dimensions of the collimation orifice of the source-holder unit are chosen as far as possible so as to have the same order of magnitude as the surface which is offered to examination by the sample of smallest size, and should if possible be fairly small. This precaution makes it possible to define the angle $\alpha$ more effectively and to eliminate as far as possible the gamma radiations which are scattered towards the detector by materials other than the sample to be studied;

in the case in which the sample contains an objectionable element which absorbs the K lines of the element determined to a substantial extent, accuracy is improved by determining this troublesome element separately whenever possible in such a manner as to correct the results obtained.

By way of example, specific reference will now be made to the structural design of a device as constructed in accordance with the invention for the purpose of determining the quantity of lead contained in pulp and of extracting lead ores.

It will be assumed that the method is applied to the determination of the quantity of lead contained in mixtures of quartz and galena. For this purpose, a measuring head is employed of the same type as that which has already been represented in FIG. 1. The gamma-radiation emitter is constituted by a source of iridium 192 of standard design.

The detector 6 is a sinctillation counter which is fitted with a sodium iodide crystal. The collimators 7 and 8 are made of lead. The screen 6 as well as the lining 11 are formed of cadmium foils having a thickness of 0.8 millimeter. The associated electronic apparatus which is represented in FIG. 3 comprises a high-tension generator 12, a linear pulse-amplifier 13 which is associated with the detector 14 of the measuring head, a single-channel amplitude selector 15, a scaler 16 and an integrator 17. The combined assembly 15–16–17 effects the counting of the pulses which are comprised within a narrow pulse-amplitude band corresponding to the photoelectric peak which is due to the K lines of lead; the amplitude discriminator 18 accepts all pulses which exceed a predetermined threshold; at 19 and 20, these pulses are counted and integrated, and the chain 18, 19, 20 will serve to measure the Compton effect. The ratio of the two count rates delivered by 17 and 20 as applied to a ratiometer 21 provides a measurement of the lead content.

The dispersion of the measurements taken by means of the device described shows that it is possible to determine within a maximum approximation of 0.5% the amount of galena which is contained in samples, namely 5%+0.5%, for example. This precision takes account of variations in granular size by a factor of 3, of possible variations in density of 20% and of considerable variations in the content of pyrites and of blende.

This determination can be made entirely automatic and can be performed on pulps in suspension which circulate within a piping system.

Another application of the method in accordance with the invention relates to the automatic sorting of lead ores for the purpose of eliminating the waste. These ores usually have a quartz base and contain pyrites and blende in variable proportions. The test must cover the major portion of the stones and not merely a surface layer. The entire production must be controlled. This sorting operation has not been practicable up to the present time by any means other than flotation, but is now made possible by means of the system which is represented diagrammatically in the overhead view of FIG. 4. The said system consists of a double measuring head 22 which is located on each side of a channel or through 23 through which the stones 24 progress one by one. Each of the two parts of said measuring head is of identical design and consists of the same materials as the detector which has previously been described. The source is iridium 192. The axes of the sources and of the detectors delimit four testing zones which overlap. The axis of each source makes an angle of 90° with each of the two detectors, with the result that no troublesome interference between the two measuring units need be expected. This arrangement permits of the examination of fairly large stones as well as stones of medium granular size. The scintillation detectors are each followed by an electronic system which is comparable with that shown in FIG. 3. The output values of the ratiometers of both chains can if necessary be mixed so as to give a more probable value of the percentage content.

The apparatus is designed to sort stones according to the maximum lead content which is observed in the volume of measurement. The contents are therefore overestimated. The sorting thresholds of the waste ores are determined by experiment.

Another alternative form consists in employing only a single measuring head which is fitted with a single detector and which is consequently followed by only one measuring chain. This design is suitable for the purpose of determining the contents of stones of either medium or small granular size.

Finally, it is possible on the basis of the principles hereinabove set forth to devise an apparatus whereby the mean content of an ore which is conveyed in bulk on a conveyor belt can be measured by means of a single measuring head which is placed either on or below the conveyor belt and by means of an automatic system for weighing the ore which is being transported over a predetermined length of said conveyor belt.

Another application of the method according to the invention consists in determining the quantity of uranium in solutions and pulps in circulation by means of the system which is similar to that which has been described with reference to the determination of lead in mixtures of quartz and galena. The measurement can be effected to within a maximum approximation of 0.5%.

It is also possible to determine to within a maximum tolerance of 0.5% (as absolute value) the quantity of plutonium contained in liquors which are free from other heavy metals.

A further application consists in determining the tungsten content of steels. The dimensions of the sample or workpiece are not critical. This quantity determination can be performed to within a maximum tolerance of 0.5%. If the samples to be tested are all identical, the measurement of the intensity of the K line of tungsten should as a rule prove sufficient, but the decay of the source must in that case be taken into account.

Other applications consist in determining the quantity of tantalum contained in mixtures of tantalum and niobium and tantalum steels, the quantity of hafnium contained in zirconium, of rare earths in their ores, of mercury in its ores, and so forth. As a general rule the method in accordance with the invention provides a ready means of determining elements having a high atomic number when only one of these elements is present in matrices having either a medium or low atomic number.

In another field of application of the invention in which the geometrical localization of known materials is taken into account, it is possible to establish the respective dimensions of said localizations. Accordingly, the invention is applicable to the measurement of thicknesses of coatings or jackets with which heavy materials are covered.

The case to which reference has just been made is of particular interest for the purpose of measuring the thickness of cladding materials on nuclear fuels. The intensity of the K line of the heavy metal depends on the thickness of the cladding and on the thickness of heavy metal if this latter is very small or if a small proportion of this metal is incorporated in an alloy. A back-scattering system which is similar to that which is described in FIG. 1 is accordingly employed for this purpose. The K line of the heavy metal support is correspondingly less effectively excited as the cladding material is of greater thickness and the absorption of said line in its path towards the detector is correspondingly higher as the coating is greater in thickness; in addition, the radiation intensity is correspondingly higher as the total thickness of the part being examined is greater. By combining the simultaneous measurement of the intensity of the K line and of the intensity of the scattered radiation, the thickness of the coating can accordingly be deduced.

One example of possible application is that of the checking of thicknesses of claddings of zircaloy on plates of zirconium alloyed with natural uranium. In this case, the plates examined are of small thickness and, as a consequence, the thickness of the cladding on each side of the plate can be checked simultaneously by utilization of an angle of incidence of 45° in respect of the exciting radiation and two detection heads which are disposed symmetrically with respect to the axis of the source on each side of the plate.

In FIG. 5, the source has been represented at 26. The isotope which is preferably employed is iridium 192. The detectors are disposed symmetrically at 27 and 28. The nuclear fuel material is shown at 29 and its cladding is shown at 30 and 31. By making use of the indications provided by the detectors, the thickness of each cladding can accordingly be deduced.

The devices which are designed to be employed for the applications of the method according to the invention all constitute novel industrial products which form a part of our invention.

What we claim is:

1. Method of analysis for determination of the quantity of heavy elements contained in a sample, the steps of exciting a fluorescent K line of a heavy element by gamma radiation emitted by a radio element, the energy of said gamma radiation being several times higher than the energy of said K line of the heavy element, simultaneously effecting separate counts for determining the intensity $I_k$ of said excited K line (quantity of heavy element) and the intensity $I_b$ of the back-scattered Compton radiation (quantity of sample tested), the ratio $I_k/I_b$ of said intensity being directly dependent on the content of heavy element.

2. Analyzing device for determination of the quantity of heavy elements contained in a sample whereby a fluorescent line of a heavy element is excited by means of gamma radiation emitted by a radio element and a measurement is taken of the intensity of said line, said device comprising a source of gamma irradiation having an energy several times higher than the energy of the K line of the heavy element to be analyzed, a source holder unit acting as a collimator to direct the gamma radiation toward the sample to be analyzed, a detector disposed within a collimator, screens and coatings on the source holder unit and on the collimator of the detector between these components and the sample and a two circuit electric counting assembly comprising in one circuit a single channel amplitude selector transmitting only the pulses corresponding to the K line of the element to be analyzed and the other circuit including an amplitude discriminator transmitting only the pulses of the Compton effect and a ratiometer connected to said two circuits.

References Cited

UNITED STATES PATENTS

| | | | |
|---|---|---|---|
| 2,711,480 | 6/1955 | Friedman | 250—43.5 X |
| 2,923,824 | 2/1960 | Martin et al. | 250—83.3 X |
| 2,950,393 | 8/1960 | Southward | 250—83.3 X |
| 3,046,402 | 7/1962 | Cherry | 250—83.30 |
| 3,056,027 | 9/1962 | Martinelli | 250—83.30 |
| 3,102,952 | 9/1963 | Hendee et al. | 250—51.5 |

RALPH G. NILSON, *Primary Examiner.*

S. ELBAUM, *Assistant Examiner.*